US012583310B1

(12) United States Patent
Chirco et al.

(10) Patent No.: US 12,583,310 B1
(45) Date of Patent: Mar. 24, 2026

(54) ASSEMBLY FOR TRANSMITTING ROTATIONAL TORQUE, AND SYSTEM INCLUDING THE SAME

(71) Applicant: BorgWarner Inc., Auburn Hills, MI (US)

(72) Inventors: Christopher Anthony Chirco, Romeo, MI (US); Gregory L. Beyerlein, Clarkston, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 19/067,087

(22) Filed: Feb. 28, 2025

(51) Int. Cl.
*B60K 6/387* (2007.10)
*B60K 6/48* (2007.10)

(52) U.S. Cl.
CPC .............. *B60K 6/48* (2013.01); *B60K 6/387* (2013.01); *B60K 2006/4825* (2013.01)

(58) Field of Classification Search
CPC ......... B60K 6/387; B60K 6/405; F16D 13/52; F16H 45/02; F16H 2045/0205–0294
See application file for complete search history.

(56) References Cited

U.S. PATENT DOCUMENTS

| | | | |
|---|---|---|---|
| 11,904,695 B2 | 2/2024 | Binder et al. | |
| 2001/0015584 A1 * | 8/2001 | Paulus-Neues | H02K 7/006 310/75 D |
| 2005/0150734 A1 * | 7/2005 | Breier | B60K 6/405 903/952 |
| 2016/0105060 A1 * | 4/2016 | Lindemann | B60K 6/442 310/78 |
| 2019/0381879 A1 | 12/2019 | Hoppe et al. | |

FOREIGN PATENT DOCUMENTS

| | | | |
|---|---|---|---|
| DE | 10221625 A1 * | 10/2003 | ............. B60K 6/485 |
| DE | 102017130348 A1 | 6/2019 | |
| DE | 102017130349 A1 | 6/2019 | |

OTHER PUBLICATIONS

Machine-assisted English language abstract and machine-assisted English translation for DE 10 2017 130 348 A1 extracted from espacenet.com database on Mar. 3, 2025, 20 pages.
Machine-assisted English language abstract and machine-assisted English translation for DE 10 2017 130 349 A1 extracted from espacenet.com database on Mar. 3, 2025, 22 pages.

\* cited by examiner

*Primary Examiner* — Stacey A Fluhart
(74) *Attorney, Agent, or Firm* — Howard & Howard Attorneys PLLC

(57) ABSTRACT

An assembly for transmitting rotational torque between an output of a drive engine and a transmission input of a transmission includes a torque converter and a clutch assembly. The torque converter includes a torque converter input member and a torque converter output member rotatably. The torque converter output member is configured to deliver rotational torque to the transmission input. The clutch assembly includes a disconnect clutch having an engaged and disengaged position. The clutch assembly also includes a clutch housing rotatably coupling the clutch input member to the torque converter input member when the disconnect clutch is in the engaged position. One of the clutch housing and the torque converter input member includes a retention groove and the other of the clutch housing and the torque converter input member includes a retention lever disposable in the retention groove to axially retain the clutch assembly.

21 Claims, 7 Drawing Sheets

22

20

28

ASSEMBLY FOR TRANSMITTING ROTATIONAL TORQUE, AND SYSTEM INCLUDING THE SAME

BACKGROUND OF THE INVENTION

1. Field of the Invention

The field of the invention generally relates to an assembly for transmitting rotational torque and a system including the assembly.

2. Description of the Related Art

In recent years, the automotive industry is increasingly moving away from combustion engine vehicles and toward electric vehicles. One drawback of an all-electric vehicle (EV) that continues, however, is the current limitation on battery technology and, resultantly, the mileage range of the vehicle. While drivers who only have short range needs do not consider this an inconvenience, drivers who at least occasionally have mileage needs beyond the typical range of an all-electric vehicle must generally choose between stopping for extended periods of time to recharge the battery or owning a second vehicle for extended mileage range driving.

To address this concern, hybrid vehicles (HV) and plug-in hybrid vehicles (PHEV) have been used. Plug-in hybrid vehicles typically first run on electricity, but then utilize an internal combustion engine, either alone or in combination with the battery, to extend the range of the vehicle before the battery needs to be recharged or gasoline or diesel added to the vehicle. Said differently, hybrid vehicles alternate between use of a combustion and an electric motor for higher mileage.

Various drivetrain architectures exist for hybrid vehicles and are known as P1, P2, P3 and P4 configurations. In a P1 configuration, the electric motor is connected to the combustion engine and located after the combustion engine. A P2 configuration locates the electric motor between the combustion engine and the transmission and allows for the combustion engine to be disconnected from the transmission. A P3 configuration locates the electric motor between the transmission and the differential. In a P4 configuration, the electric motor directly drives the axles.

Of these configurations the P2 configuration is often considered to be the most versatile of the four different configurations in that it allows hybrid technology to be incorporated in to existing combustion engine powertrains with minimal modification to the existing powertrain.

In typical P2 configurations of drivetrains, a clutch assembly including a disconnect clutch is connectable to a torque converter of the vehicle. However, installation of the clutch assembly to the torque converter can present numerous problems. For example, orienting the clutch assembly and the torque converter relative to one another can be challenging and, oftentimes, requires a very specific angular orientation of the clutch assembly and the torque converter to one another. To attempt to accommodate a blind assembly of the clutch assembly and the torque converter, known solutions, such as a circlip, may be considered, but use of a circlip presents numerous design and integration challenges.

To this end, there is a need for a clutch assembly that is connectable to a torque converter through blind assembly that addresses the design and integration challenges presented by current solutions.

SUMMARY OF THE INVENTION AND ADVANTAGES

An assembly for transmitting rotational torque between an output of a drive engine and a transmission input of a transmission includes a torque converter and a clutch assembly. The torque converter includes a torque converter input member disposed about an axis, and a torque converter output member disposed about the axis and rotatably coupled to the torque converter input member to receive rotational torque from the torque converter input member. The torque converter output member is configured to deliver rotational torque to the transmission input. The clutch assembly includes a disconnect clutch including a clutch input member that is configured to be rotatably coupled to the output of the drive engine. The disconnect clutch has an engaged position where the clutch input member is rotatably coupled to the torque converter input member, and a disengaged position where the clutch input member is rotatably uncoupled to the torque converter input member. The clutch assembly also includes a clutch housing disposed about the axis. The clutch housing rotatably couples the clutch input member to the torque converter input member when the disconnect clutch is in the engaged position. One of the clutch housing and the torque converter input member includes a retention groove and the other of the clutch housing and the torque converter input member includes a retention lever disposable in the retention groove to axially retain the clutch assembly to the torque converter with respect to the axis.

Having one of the clutch housing and the torque converter input member including a retention groove and the other of the clutch housing and the torque converter input member including a retention lever disposable in the retention groove to axially retain the clutch assembly to the torque converter with respect to the axis allows for blind assembly of the clutch assembly to the torque converter.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
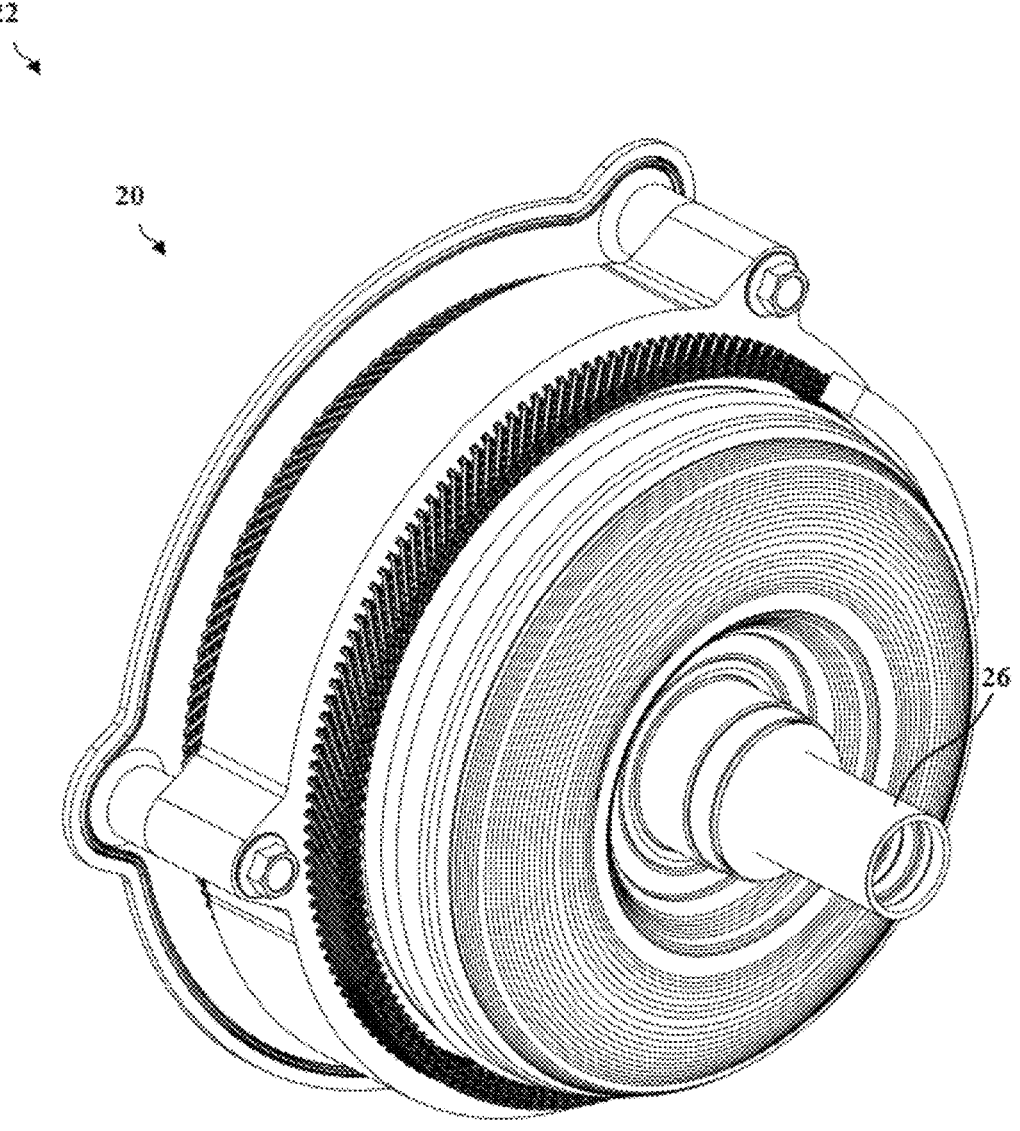
FIG. 1 is a perspective view of an assembly for transmitting rotational torque, and a system including the assembly.
Figure 2:
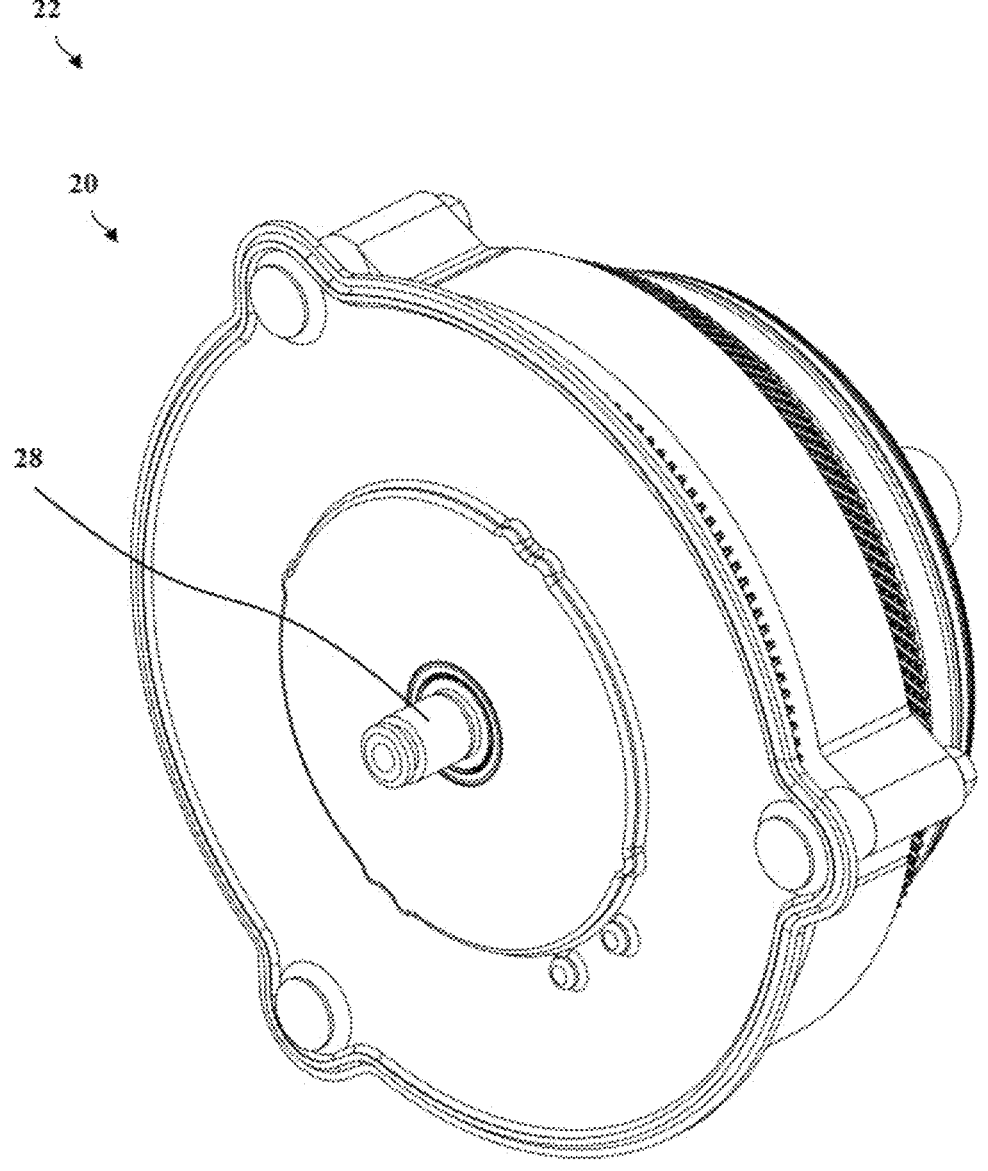
FIG. 2 is another perspective view of the assembly and system of FIG. 1.
Figure 3:
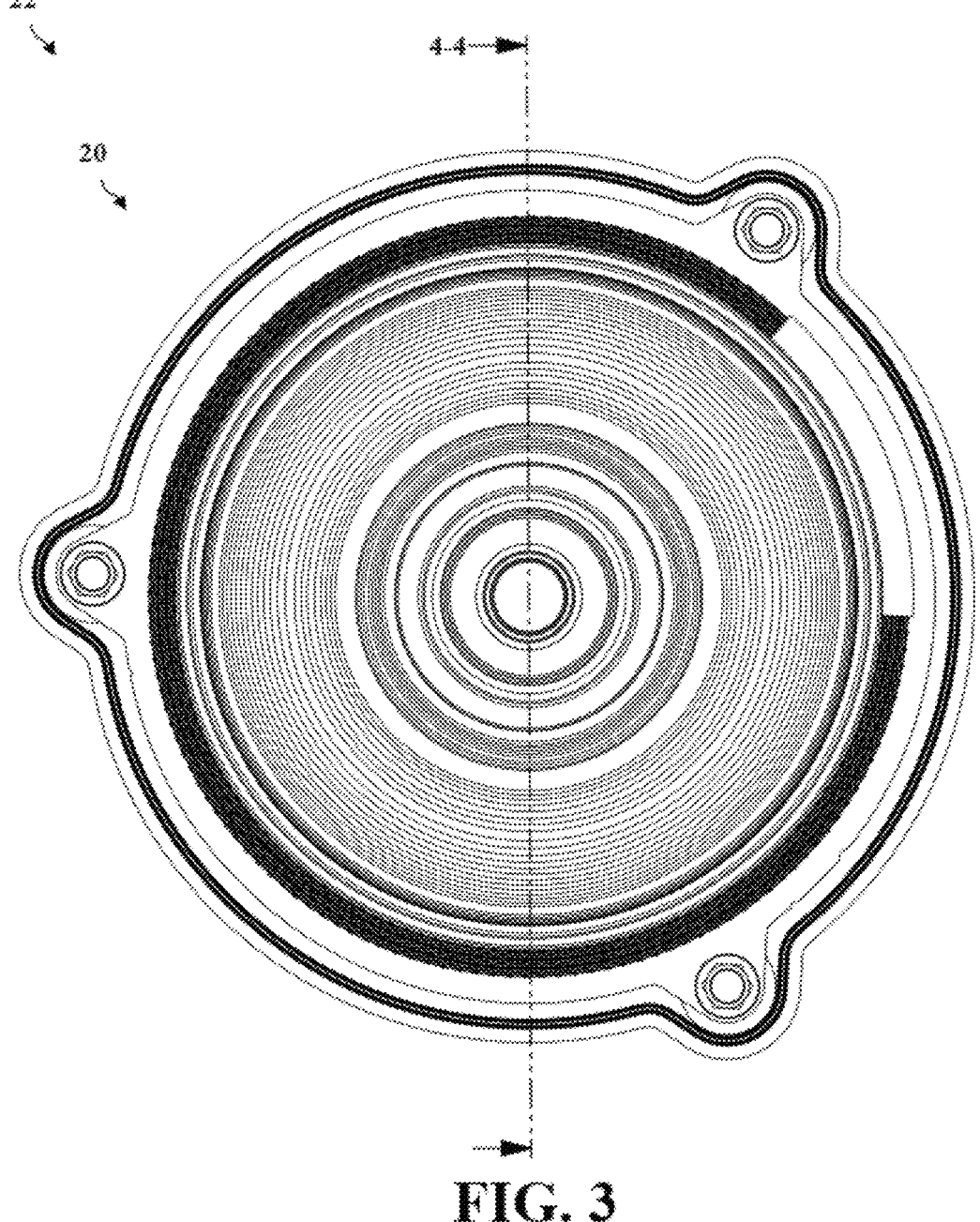
FIG. 3 is a front view of the assembly and system of FIG. 1.
Figure 4:
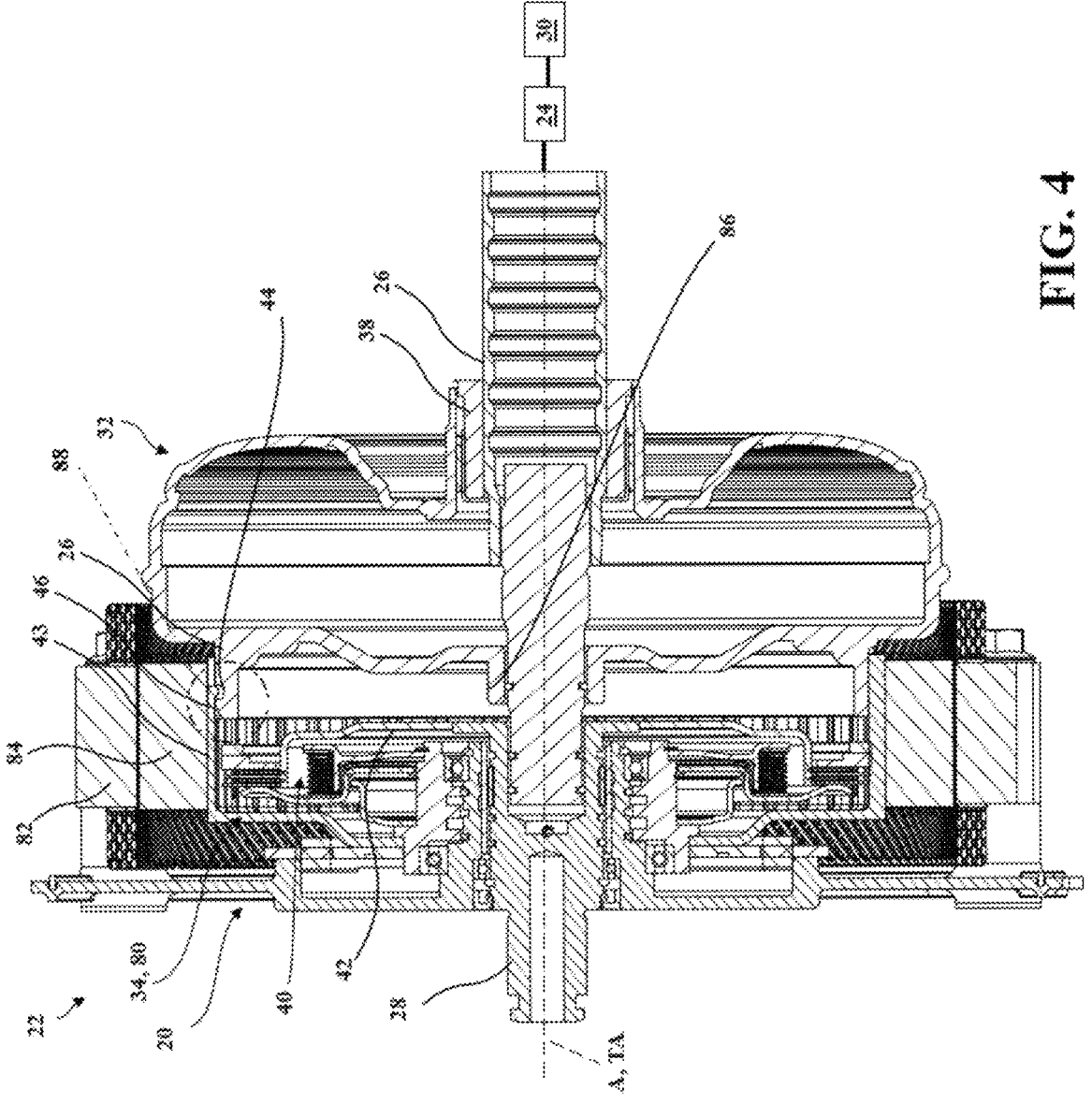
FIG. 4 is a cross-sectional view of the assembly and system, with the system including a transmission input extending along a transmission axis and configured to receive rotational torque from an output of a drive engine of a vehicle, and with the assembly including a torque converter having a torque converter input member and torque converter output member, and a clutch assembly including a disconnect clutch and a clutch housing.

With reference to the Figures, wherein like numerals indicate like parts throughout the several views, an assembly 20 for transmitting rotational torque is shown in FIGS. 1-4. With particular reference to FIG. 4, the assembly 20 may be included in a system 22, with the system 22 including a transmission 24 including a transmission input 26, such as a transmission input shaft, extending along a transmission axis TA. The transmission input 26 is configured to receive rotational torque from an output 28 of a drive engine, such as an internal combustion engine, of a vehicle. The transmission 24 also includes a transmission output 30 configured to deliver rotational torque, such as to wheels of the vehicle.

The assembly 20 transmits rotational torque between the output 28 of the drive engine and the transmission input 26 of the transmission 24. The assembly 20 includes a torque converter 32 and a clutch assembly 34. The torque converter 32 includes a torque converter input member 36, as shown in perspective view in FIG. 6, disposed about an axis A, and a torque converter output member 38 disposed about the axis A and rotatably coupled to the torque converter input member 36 to receive rotational torque from the torque converter input member 36. Typically, the transmission axis TA is coaxial with the axis A of the torque converter 32.

The torque converter output member 38 is configured to deliver rotational torque to the transmission input 26. With reference now to FIG. 4, the clutch assembly 34 includes a disconnect clutch 40 including a clutch input member 42 that is configured to be rotatably coupled to the output 28 of the drive engine. The disconnect clutch 40 has an engaged position where the clutch input member 42 is rotatably coupled to the torque converter input member 36, and a disengaged position where the clutch input member 42 is rotatably uncoupled to the torque converter input member 36.

Figure 5:
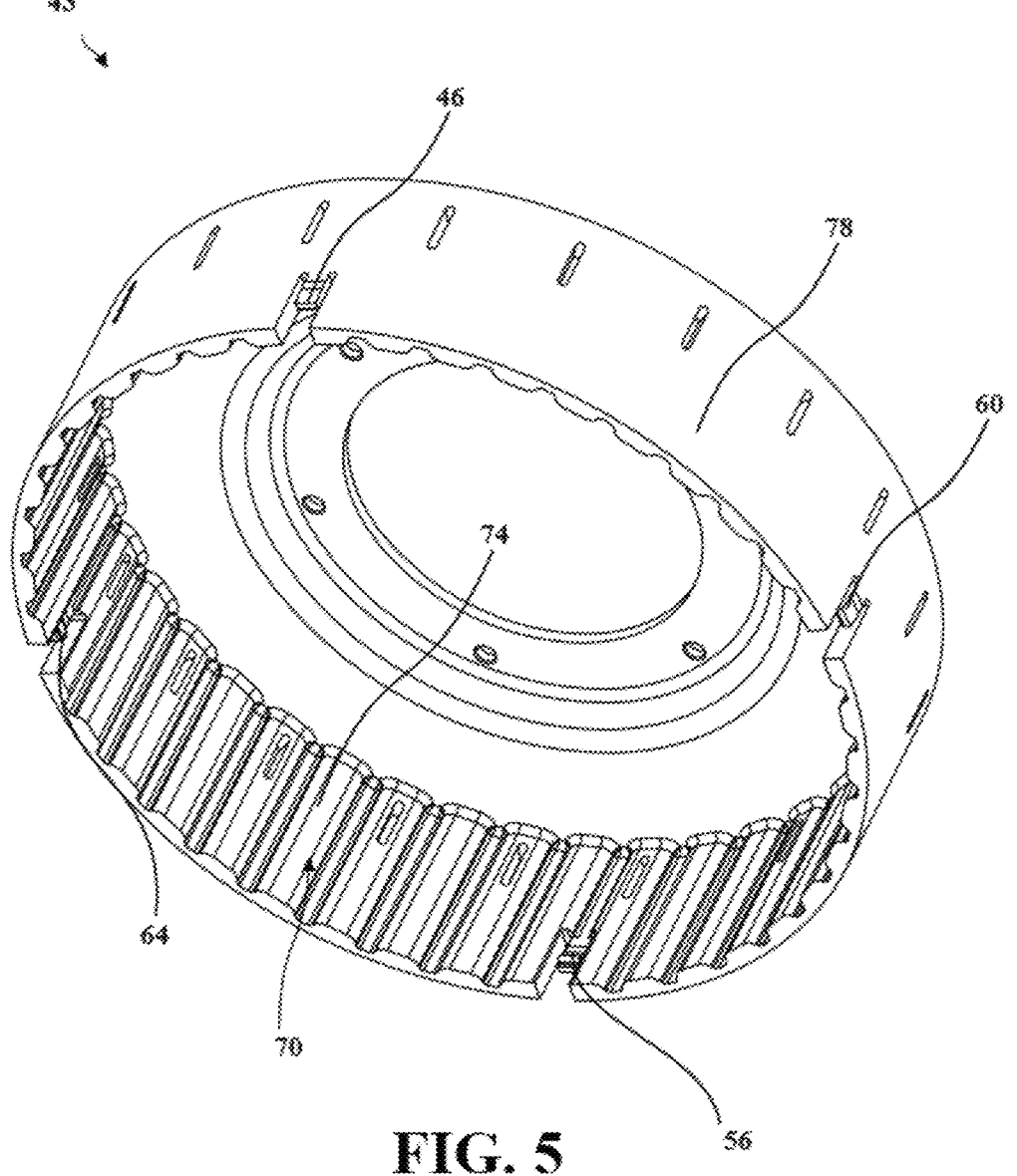
FIG. 5 is a perspective view of the clutch housing.

The clutch assembly 34 also includes a clutch housing 43, as shown in perspective view in FIG. 5, disposed about the axis A. The clutch housing 43 rotatably couples the clutch input member 42 to the torque converter input member 36 when the disconnect clutch 40 is in the engaged position.

Figure 6:
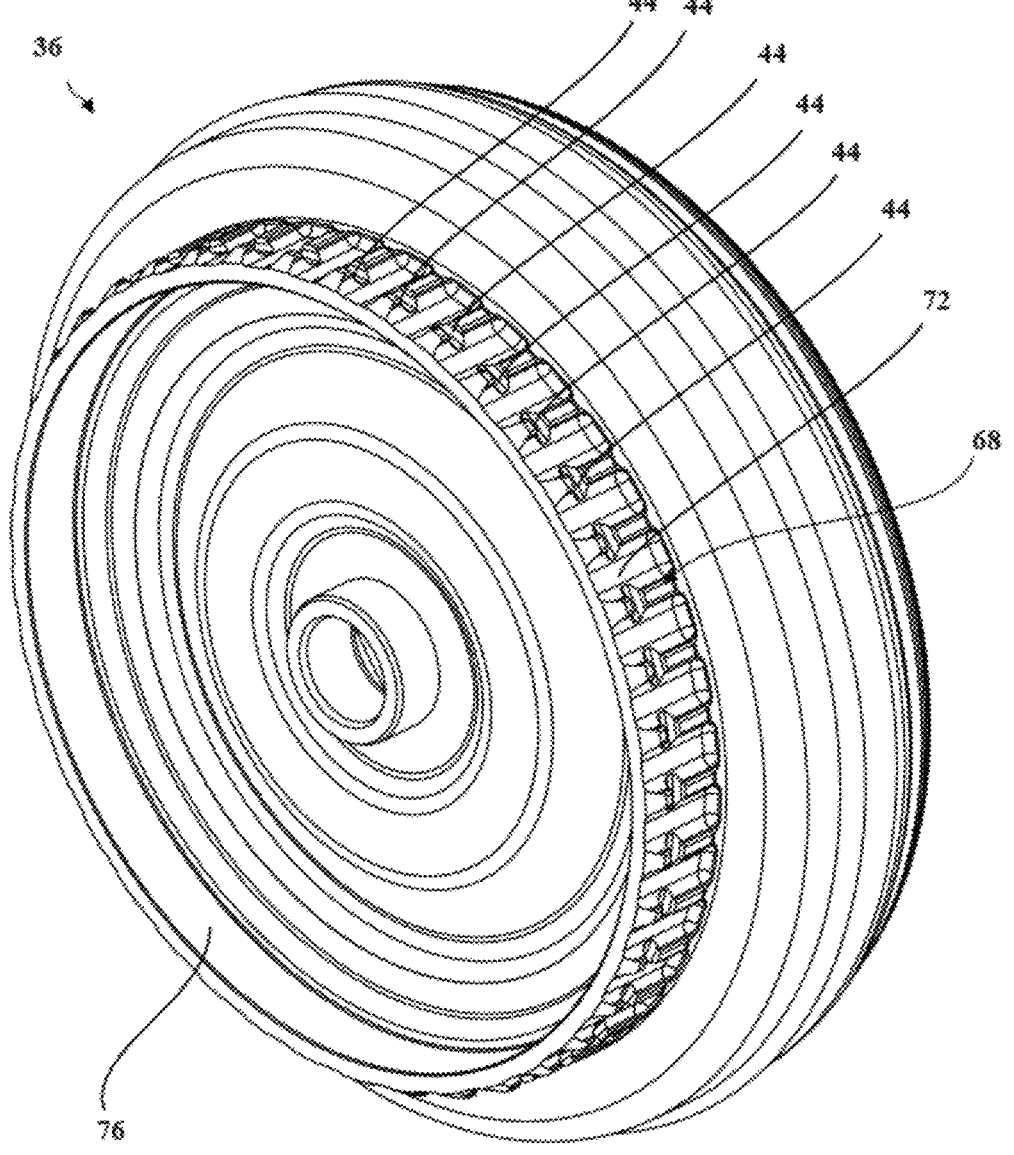
FIG. 6 is a perspective view of the torque converter input member.

With particular reference again to FIG. 4, one of the clutch housing 43 and the torque converter input member 36 includes a retention groove 44 and the other of the clutch housing 43 and the torque converter input member 36 includes a retention lever 46, which may be referred to as cantilevered lever, disposable in the retention groove 44 to axially retain the clutch assembly 34 to the torque converter 32 with respect to the axis A. For example, in one embodiment, the clutch housing 43 includes the retention lever 46, and the torque converter input member 36 includes the retention groove 44. In another embodiment, the clutch housing 43 includes the retention groove 44, and the torque converter input member 36 includes the retention lever 46. It is contemplated that the description regarding the retention lever 46 and the retention groove 44 includes the embodiment where the clutch housing 43 includes the retention lever 46 and the torque converter input member 36 includes the retention groove 44, and the embodiment where the clutch housing 43 includes the retention groove 44 and the torque converter input member 36 includes the retention lever 46. The retention groove 44 may be defined 360 degrees about the axis A such that the retention lever 46 is disposable in the retention groove 44 regardless of an angular orientation of the retention lever 46 with respect to the axis A. The retention groove 44 may be defined as a plurality of retention grooves, such as shown in FIG. 6, which helps with blind assembly of the clutch housing 47 to the torque converter input member 36.

Having one of the clutch housing 43 and the torque converter input member 36 including the retention groove 44 and the other of the clutch housing 43 and the torque converter input member 36 including the retention lever 46 provides several advantages. First, as described above, the retention lever 46 disposed in the retention groove 44 axially retains the clutch assembly 34 to the torque converter 32. Second, having one of the clutch housing 43 and the torque converter input member 36 including the retention groove 44 and the other of the clutch housing 43 and the torque converter input member 36 including the retention lever 46 allows for easier installation of the clutch assembly 34 to the torque converter 32. Specifically, when installing the clutch assembly 34 and the torque converter 32, the retention lever 46 and the retention groove 44 allow for blind assembly of the clutch assembly 34 to the torque converter 32. Even further, allowing for blind assembly of the clutch assembly 34 to the torque converter 32 allows the torque converter 32 and transmission 24 architecture to largely remain the same as the clutch assembly 34 may be assembled into the system 22 after the torque converter 32 and transmission 24 are already assembled to one another. This is particularly advantageous in embodiments where the clutch assembly 34 is further defined as a P2 module 80, as described in further detail below. Third, having one of the clutch housing 43 and the torque converter input member 36 including the retention groove 44 and the other of the clutch housing 43 and the torque converter input member 36 including the retention lever 46 to axially retain the clutch assembly 34 to the torque converter 32 results in the interaction between the clutch assembly 34 and the torque converter 32 to be independent from the transmission input 26. Having the interaction of the clutch assembly 34 and the torque converter 32 independent from the transmission input 26 allows the transmission input 26, the output 28 of the drive engine, and the torque converter input member 36 to selectively rotate in unison with one another or at different rotational speeds from one another depending on the position of the disconnect clutch 40.

Figures 7, 8, 9:
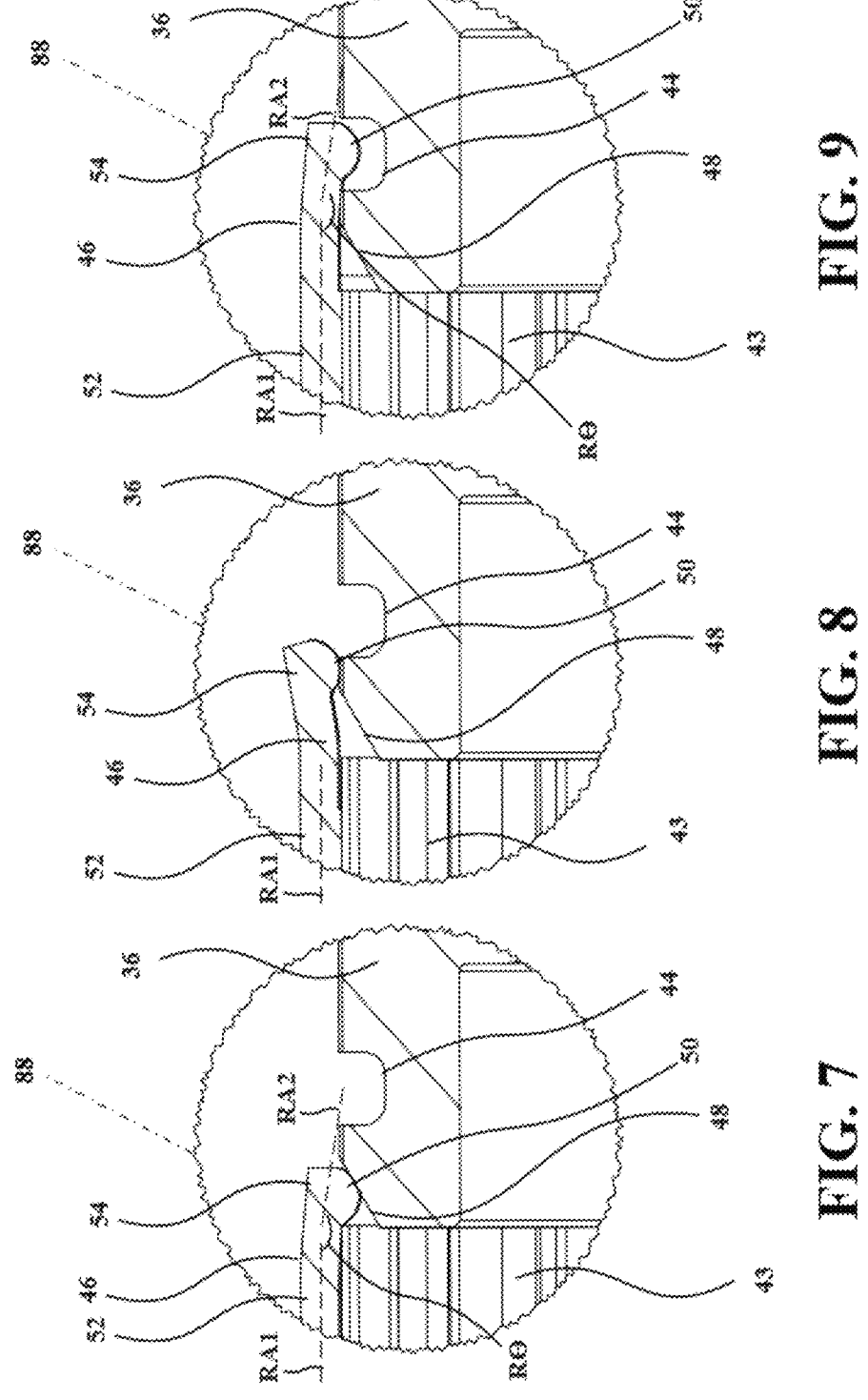
FIG. 7 is a partial cross-sectional view of the clutch assembly including a retention lever and the torque converter input member including a retention groove, with the retention lever in a first retention position.
FIG. 8 is a partial cross-sectional view of the clutch assembly with the retention lever in an intermediate retention position.
FIG. 9 is a partial cross-sectional view of the clutch assembly with the retention lever in the second retention position to axially retain the clutch assembly to the torque converter.

To help facilitate the disposing of the retention lever 46 in the retention groove 44, the other of the clutch housing 43 and the torque converter input member 36 includes a chamfered surface 48 configured to be engaged by the retention lever 46 as the clutch housing 43 moves along the axis A toward the torque converter 32. The retention lever 46 may include a retention protrusion 50 extending toward the retention groove 44, with the retention lever 46 being movable between a first retention position where the retention lever 46 is engaged with the chamfered surface 48, as shown in FIG. 7, and a second retention position where the retention protrusion 50 is disposed in the retention groove 44 to axially retain the clutch assembly 34 to the torque converter 32 with respect to the axis A, as shown in FIG. 9. It is to be appreciated that the retention lever 46 may have intermediate retention positions between the first and second retention positions, as shown in FIG. 8.

To further help facilitate the disposing of the retention lever 46 in the retention groove 44, the retention lever 46 may include a first retention portion 52 extending along a retention lever first axis RA1, and a second retention portion 54 extending along a retention lever second axis RA2, with the retention lever second axis RA2 being obliquely oriented with respect to the retention lever first axis RA1. In such embodiments, the retention lever second axis RA2 may be oriented such that the retention lever second axis RA2 and, therefore, the second retention portion 54 extends toward the axis A and snaps into the retention groove 44 when the retention lever 46 is in the second position, as shown in FIG. 9. In one embodiment, a retention angle R⊖ is defined between the retention lever first axis RA1 and the retention lever second axis RA2. It is to be appreciated that the retention angle R⊖ may be any suitable angle for disposing the retention lever 46 in the retention groove 44 and that the retention angle R⊖ may be determined based on a number of factors, such as the length of the retention lever 46, thickness of the retention lever 46, length of the retention protrusion 50, and the like.

In another embodiment, one of the clutch housing 43 and the torque converter input member 36 includes a second retention lever 56 disposable in the retention groove 44 to axial retain the P2 module 80 to the torque converter 32 with respect to the axis A. In such embodiments, the retention groove 44 defined by the other of the clutch housing 43 and the torque converter input member 36 may include a single retention groove defined 360 degrees about the axis A, or the other of the clutch housing 43 and the torque converter input member 36 may include a plurality of retention grooves 44. When the second retention groove 58 is present, the retention lever 46 is disposable in a first retention groove of the plurality of retention grooves 44 and the second retention lever 56 is disposable in a second retention groove of the plurality of retention grooves 44. When the retention lever 46 and the second retention lever 56 are present, the retention lever 46 and the second retention lever 56 may be equally angularly spaced from one another about the axis A.

In another embodiment, one of the clutch housing 43 and the torque converter input member 36 may include a third retention lever 60 disposable in the retention groove 44 to axial retain the clutch assembly 34 to the torque converter 32 with respect to the axis A. Similar to as described above, the retention groove 44 defined by the other of the clutch housing 43 and the torque converter input member 36 may include a single retention groove defined 360 degrees about the axis A, or the other of the clutch housing 43 and the torque converter input member 36 may include a plurality of retention grooves 44 including a second retention groove and a third retention groove. When the retention groove 44 is a single retention groove defined 360 degrees about the axis A, the retention lever 46, the second retention lever 56, and the third retention lever 60 are each disposable in the retention groove 44 regardless of angular orientation of the retention lever 46, the second retention lever 56, and the third retention lever 60, which allows for blind assembly of the clutch assembly 34 to the torque converter 32. When the plurality of retention grooves 44 is present, the retention lever 46 is disposable in a first retention groove of the plurality of retention grooves 44, the second retention lever 56 is disposable in a second retention groove of the plurality of retention grooves 44, and the third retention lever 60 is disposable in a third retention groove of the plurality of retention grooves 44. When the retention lever 46, the second retention lever 56, and the third retention lever 60 are present, the retention lever 46, the second retention lever 56, and the third retention lever 60 may be equally angularly spaced from one another about the axis.

In yet another embodiment, one of the clutch housing 43 and the torque converter input member 36 may include a fourth retention lever 64 disposable in the retention groove 44 to axial retain the clutch assembly 34 to the torque converter 32 with respect to the axis A. Similar to as described above, the retention groove 44 defined by the other of the clutch housing 43 and the torque converter input member 36 may include a single retention groove defined 360 degrees about the axis A, or the other of the clutch housing 43 and the torque converter input member 36 may include a plurality of retention grooves 44 including a second retention groove, a third retention groove, and a fourth retention groove. When the retention groove 44 is a single retention groove defined 360 degrees about the axis A, the retention lever 46, the second retention lever 56, the third retention lever 60, and the fourth retention lever 64 are each disposable in the retention groove 44 regardless of angular orientation of the retention lever 46, the second retention lever 56, the third retention lever 60, and the fourth retention lever 64, which allows for blind assembly of the clutch assembly 34 to the torque converter 32. When the fourth retention groove of the plurality of retention grooves 44, the retention lever 46 is disposable in a first retention groove of the plurality of retention grooves 44, the second retention lever 56 is disposable in a second retention groove of the plurality of retention grooves 44, the third retention lever 60 is disposable in a third retention groove of the plurality of retention grooves 44, and the fourth retention lever 64 is disposed in a fourth retention groove of the plurality of retention grooves 44. When the retention lever 46, the second retention lever 56, the third retention lever 60, and the fourth retention lever 64 are present, the retention lever 46, the second retention lever 56, the third retention lever 60, and the fourth retention lever 64 may be equally angularly spaced from one another about the axis.

While the retention lever 46 and the retention groove 44 axially retain the clutch assembly 34 with respect to the torque converter 32, the torque converter input member 36 may include a first set of splines 68 and the clutch housing 43 may include a second set of splines 70 coupled to the first set of splines 68 to form a splined engagement, which allows the clutch housing 43 to deliver rotational torque to the torque converter input member 36. In one embodiment, the torque converter input member 36 has an input outer surface 72 facing away from the axis A and having the first set of splines 68, and the clutch housing 43 has a clutch housing inner surface 74 facing the axis A and having the second set of splines 70. It is to be appreciated that the torque converter input member 36 may have an input inner surface 76 facing the axis A and having the first set of splines 68 and that the clutch housing 43 may have a clutch housing outer surface 78 facing away from the axis A and having the second set of splines 70. It is to be appreciated that the first set of splines 68 may include the retention groove 44.

As described above, the clutch assembly 34 may be further described as a P2 module 80. In such embodiments, the P2 module 80 includes a stator 82 disposed about the axis A and a rotor 84. In one embodiment, the clutch housing 43 is the rotor 84. In other words, in such embodiments, the clutch housing 43 is rotatable by electric current supplied to the stator 82 and, therefore, the clutch housing 43 provides rotational torque to the torque converter input member 36. In other embodiments, the rotor 84 may be a separate component from the clutch housing 43. In other words, the rotor 84 is rotatably by electric current supplied to the stator 82, and the clutch housing 43 is coupled to the rotor 84 such that as the rotor 84 rotates about the axis A, the clutch housing 43 also rotates to provide rotational torque to the torque converter input member 36. For example, the rotor 84 may be disposed about the clutch housing 43, such as coupled to the clutch housing outer surface 78, as shown in FIG. 4. When the rotor 84 is disposed about the clutch housing 43, such as coupled to the clutch housing outer surface 78, the clutch housing 43 may be further defined as a hub of the rotor 84.

The clutch assembly 34 described herein provides further advantages. Specifically, having one of the clutch housing 43 and the torque converter input member 36 including the retention groove 44 and the other of the clutch housing 43 and the torque converter input member 36 allows for the clutch housing 43 to be rotatable in unison with the torque converter input member 36. Additionally, the transmission input 26 may be rotatable both in unison with and different from the torque converter input member 36. For example, the transmission input 26 may be rotatable in unison with the torque converter input member 36 when the disconnect clutch 40 is the engaged position, and the transmission input 26 may be rotatable different from the torque converter input member 36 when the disconnect clutch 40 is in the disengaged position. This is possible due to having one of the clutch housing 43 and the torque converter input member 36 including the retention groove 44 and the other of the clutch housing 43 and the torque converter input member 36 including the retention lever 46 to axially retain the clutch assembly 34 to the torque converter 32, rather than having the clutch assembly 34 being axially retained to a nose 86 of the torque converter 32. The transmission input 26 may be rotatable in unison with the output 28 of the drive engine when the disconnect clutch 40 is in the engaged position.

Embodiment 1: An assembly for transmitting rotational torque between an output of a drive engine and a transmission input of a transmission, said assembly comprising:

a torque converter comprising, a torque converter input member disposed about an axis, and a torque converter output member disposed about said axis and rotatably coupled to said torque converter input member to receive rotational torque from said torque converter input member, wherein said torque converter output member is configured to deliver rotational torque to the transmission input; and a clutch assembly comprising, a disconnect clutch comprising a clutch input member that is configured to be rotatably coupled to the output of the drive engine, wherein said disconnect clutch has an engaged position where said clutch input member is rotatably coupled to said torque converter input member, and a disengaged position where said clutch input member is rotatably uncoupled to said torque converter input member, and a clutch housing disposed about said axis, wherein said clutch housing rotatably couples said clutch input member to said torque converter input member when said disconnect clutch is in said engaged position;

wherein one of said clutch housing and said torque converter input member comprises a retention groove and the other of said clutch housing and said torque converter input member comprises a retention lever disposable in said retention groove to axially retain said clutch assembly to said torque converter with respect to said axis Embodiment 2: The assembly as set forth in embodiment 1, wherein said clutch assembly is further defined as a P2 module, wherein said P2 module comprises a stator disposed about said axis, and wherein said clutch housing is further defined as a rotor.

Embodiment 3: The assembly as set forth in embodiment 1, wherein said clutch assembly is further defined as a P2 module, wherein said P2 module comprises a stator disposed about said axis and a rotor, and wherein said clutch housing is rotatably coupled to said rotor of said P2 module.

Embodiment 4: The assembly as set forth in any one of the preceding embodiments, wherein said clutch housing comprises said retention lever, and wherein said torque converter input member comprises said retention groove.

Embodiment 5: The assembly as set forth in any one of embodiments 1-3, wherein said clutch housing comprises said retention groove, and wherein said torque converter input member comprises said retention lever.

Embodiment 6: The assembly as set forth in any one of the preceding embodiments, wherein said torque converter input member comprises a first set of splines, and wherein said clutch housing comprises a second set of splines coupled to said first set of splines to form a splined engagement.

Embodiment 7: The assembly as set forth in embodiment 6, wherein said torque converter input member has an input outer surface facing away from said axis and having said first set of splines, and wherein said clutch housing has a clutch housing inner surface facing said axis and having said second set of splines.

Embodiment 8: The assembly as set forth in any one of the preceding embodiments, wherein one of said clutch housing and said torque converter input member comprises a second retention lever disposable in said retention groove to axial retain said clutch assembly to said torque converter with respect to said axis.

Embodiment 9: The assembly as set forth in embodiment 8, wherein the other of said clutch housing and said torque converter input member comprises a second retention groove, and wherein said second retention lever is disposable in said second retention groove.

Embodiment 10: The assembly as set forth in any one of embodiments 8 and 9, wherein said retention lever and said second retention lever are equally angularly spaced from one another about said axis.

Embodiment 11: The assembly as set forth in any one of embodiments 8-10, wherein one of said clutch housing and said torque converter input member comprises a third retention lever disposable in said retention groove to axial retain said clutch assembly to said torque converter with respect to said axis.

Embodiment 12: The assembly as set forth in embodiment 11, wherein the other of said clutch housing and said torque converter input member comprises a second retention groove and a third retention groove, wherein said second retention lever is disposable in said second retention groove and said third retention lever is disposable in said third retention groove.

Embodiment 13: The assembly as set forth in any one of embodiments 11 and 12, wherein said retention lever, said second retention lever, and said third retention lever are equally angularly spaced from one another about said axis.

Embodiment 14: The assembly as set forth in embodiment 11, wherein said retention groove is defined 360 degrees about said axis such that said first, second, and third retention levers are disposable in said retention groove regardless of an angular orientation of said first, second, and third retention levers with respect to said axis.

Embodiment 15: The assembly as set forth in any one of the preceding embodiments, wherein said retention groove is defined 360 degrees about said axis such that said retention lever is disposable in said retention groove regardless of an angular orientation of said retention lever with respect to said axis.

Embodiment 16: The assembly as set forth in any one of the preceding embodiments, wherein the other of said clutch housing and said torque converter input member comprises a chamfered surface configured to be engaged by said retention lever as said clutch housing moves along said axis toward said torque converter.

Embodiment 17: The assembly as set forth in embodiment 16, wherein said retention lever comprises a retention protrusion extending toward said retention groove, and wherein said retention lever is movable between a first retention position where said retention lever is engaged with said chamfered surface, and a second retention position where said retention protrusion is disposed in said retention groove to axially retain said clutch assembly to said torque converter with respect to said axis.

Embodiment 18: A system comprising:

a transmission comprising a transmission input extending along a transmission axis and configured to receive rotational torque from an output of a drive engine of a vehicle, and a transmission output configured to deliver rotational torque; and an assembly configured to transmit rotational torque between the output of the drive engine and said transmission input, said assembly comprising:

a torque converter comprising, a torque converter input member disposed about a torque converter axis, and a torque converter output member disposed about said torque converter axis and rotatably coupled to said torque converter input member to receive rotational torque from said torque converter input member, wherein said torque converter output member is configured to deliver rotational torque to said transmission input, and a clutch assembly comprising, a disconnect clutch comprising a clutch input member that is configured to be rotatably coupled to the output of the drive engine, wherein said disconnect clutch has an engaged position where said clutch input member is rotatably coupled to said torque converter input member, and a disengaged position where said clutch input member is rotatably uncoupled to said torque converter input member, and a clutch housing disposed about said axis, wherein said clutch housing rotatably couples said clutch input member to said torque converter input member when said disconnect clutch is in said engaged position, wherein one of said clutch housing and said torque converter input member comprises a retention groove and the other of said clutch housing and said torque converter input member comprises a retention lever disposable in said retention groove to axially retain said clutch assembly to said torque converter with respect to said axis.

Embodiment 19: The system as set forth in embodiment 18, wherein said clutch assembly is further defined as a P2 module, wherein said P2 module comprises a stator disposed about said axis, and wherein said clutch housing is further defined as a rotor.

Embodiment 20: The system as set forth in embodiment 18, wherein said clutch assembly is further defined as a P2 module, wherein said P2 module comprises a stator disposed about said axis, and wherein said clutch housing rotatably coupled to a rotor.

Embodiment 21: The system as set forth in any one of embodiments 18-20, wherein said clutch housing is rotatable in unison with said torque converter input member.

Embodiment 22: The system as set forth in embodiment 21, wherein said transmission input is rotatable both in unison with and different from said torque converter input member.

Embodiment 23: The system as set forth in embodiment 22, wherein said transmission input is configured to be rotatable in unison with the output of the drive engine when said disconnect clutch is in said engaged position.

What is claimed is:

1. An assembly for transmitting rotational torque between an output of a drive engine and a transmission input of a transmission, said assembly comprising:

a torque converter comprising, a torque converter input member disposed about an axis, and a torque converter output member disposed about said axis and rotatably coupled to said torque converter input member to receive rotational torque from said torque converter input member, wherein said torque converter output member is configured to deliver rotational torque to the transmission input; and a clutch assembly comprising, a disconnect clutch comprising a clutch input member that is configured to be rotatably coupled to the output of the drive engine, wherein said disconnect clutch has an engaged position where said clutch input member is rotatably coupled to said torque converter input member, and a disengaged position where said clutch input member is rotatably uncoupled to said torque converter input member, and a clutch housing disposed about said axis, wherein said clutch housing rotatably couples said clutch input member to said torque converter input member when said disconnect clutch is in said engaged position;

wherein one of said clutch housing and said torque converter input member comprises a retention groove and the other of said clutch housing and said torque converter input member comprises a retention lever disposable in said retention groove to axially retain said clutch assembly to said torque converter with respect to said axis;

wherein the other of said clutch housing and said torque converter input member comprises a chamfered surface configured to be engaged by said retention lever as said clutch housing moves along said axis toward said torque converter; and wherein said retention lever comprises a retention protrusion extending toward said retention groove, and wherein said retention lever is movable between a first retention position where said retention lever is engaged with said chamfered surface, and a second retention position where said retention protrusion is disposed in said retention groove to axially retain said clutch assembly to said torque converter with respect to said axis.

2. The assembly as set forth in claim 1, wherein said clutch assembly is further defined as a P2 module, wherein said P2 module comprises a stator disposed about said axis, and wherein said clutch housing is further defined as a rotor.

3. The assembly as set forth in claim 1, wherein said clutch assembly is further defined as a P2 module, wherein said P2 module comprises a stator disposed about said axis and a rotor, and wherein said clutch housing is rotatably coupled to said rotor of said P2 module.

4. The assembly as set forth in claim 1, wherein said clutch housing comprises said retention lever, and wherein said torque converter input member comprises said retention groove.

5. The assembly as set forth in claim 1, wherein said clutch housing comprises said retention groove, and wherein said torque converter input member comprises said retention lever.

6. The assembly as set forth in claim 1, wherein said torque converter input member comprises a first set of splines, and wherein said clutch housing comprises a second set of splines coupled to said first set of splines to form a splined engagement.

7. The assembly as set forth in claim 6, wherein said torque converter input member has an input outer surface facing away from said axis and having said first set of splines, and wherein said clutch housing has a clutch housing inner surface facing said axis and having said second set of splines.

8. The assembly as set forth in claim 1, wherein one of said clutch housing and said torque converter input member comprises a second retention lever disposable in said retention groove to axial retain said clutch assembly to said torque converter with respect to said axis.

9. The assembly as set forth in claim 8, wherein the other of said clutch housing and said torque converter input member comprises a second retention groove, and wherein said second retention lever is disposable in said second retention groove.

10. The assembly as set forth in claim 8, wherein said retention lever and said second retention lever are equally angularly spaced from one another about said axis.

11. The assembly as set forth in claim 8, wherein one of said clutch housing and said torque converter input member comprises a third retention lever disposable in said retention groove to axial retain said clutch assembly to said torque converter with respect to said axis.

12. The assembly as set forth in claim 11, wherein the other of said clutch housing and said torque converter input member comprises a second retention groove and a third retention groove, wherein said second retention lever is disposable in said second retention groove and said third retention lever is disposable in said third retention groove.

13. The assembly as set forth in claim 11, wherein said retention lever, said second retention lever, and said third retention lever are equally angularly spaced from one another about said axis.

14. The assembly as set forth in claim 11, wherein said retention groove is defined 360 degrees about said axis such that said first, second, and third retention levers are disposable in said retention groove regardless of an angular orientation of said first, second, and third retention levers with respect to said axis.

15. The assembly as set forth in claim 1, wherein said retention groove is defined 360 degrees about said axis such that said retention lever is disposable in said retention groove regardless of an angular orientation of said retention lever with respect to said axis.

16. A system comprising:
a transmission comprising a transmission input extending along a transmission axis and configured to receive rotational torque from an output of a drive engine of a vehicle, and a transmission output configured to deliver rotational torque; and
an assembly configured to transmit rotational torque between the output of the drive engine and said transmission input, said assembly comprising:
    a torque converter comprising,
        a torque converter input member disposed about a torque converter axis, and
        a torque converter output member disposed about said torque converter axis and rotatably coupled to said torque converter input member to receive rotational torque from said torque converter input member, wherein said torque converter output member is configured to deliver rotational torque to said transmission input, and
    a clutch assembly comprising,
        a disconnect clutch comprising a clutch input member that is configured to be rotatably coupled to the output of the drive engine, wherein said disconnect clutch has an engaged position where said clutch input member is rotatably coupled to said torque converter input member, and a disengaged position where said clutch input member is rotatably uncoupled to said torque converter input member, and
        a clutch housing disposed about said axis, wherein said clutch housing rotatably couples said clutch input member to said torque converter input member when said disconnect clutch is in said engaged position;
wherein one of said clutch housing and said torque converter input member comprises a retention groove and the other of said clutch housing and said torque converter input member comprises a retention lever disposable in said retention groove to axially retain said clutch assembly to said torque converter with respect to said axis;
wherein the other of said clutch housing and said torque converter input member comprises a chamfered surface configured to be engaged by said retention lever as said clutch housing moves along said axis toward said torque converter; and
wherein said retention lever comprises a retention protrusion extending toward said retention groove, and wherein said retention lever is movable between a first retention position where said retention lever is engaged with said chamfered surface, and a second retention position where said retention protrusion is disposed in said retention groove to axially retain said clutch assembly to said torque converter with respect to said axis.

17. The system as set forth in claim 16, wherein said clutch assembly is further defined as a P2 module, wherein said P2 module comprises a stator disposed about said axis, and wherein said clutch housing is further defined as a rotor.

18. The system as set forth in claim 16, wherein said clutch assembly is further defined as a P2 module, wherein said P2 module comprises a stator disposed about said axis, and wherein said clutch housing rotatably coupled to a rotor.

19. The system as set forth in claim 16, wherein said clutch housing is rotatable in unison with said torque converter input member.

20. The system as set forth in claim 19, wherein said transmission input is rotatable both in unison with and different from said torque converter input member.

21. The system as set forth in claim 20, wherein said transmission input is configured to be rotatable in unison with the output of the drive engine when said disconnect clutch is in said engaged position.

* * * * *